(12) United States Patent
Wolański et al.

(10) Patent No.: US 11,795,891 B2
(45) Date of Patent: Oct. 24, 2023

(54) DETONATION ROCKET ENGINE COMPRISING AN AEROSPIKE NOZZLE AND CENTRING ELEMENTS WITH COOLING CHANNELS

(71) Applicant: Sieć Badawcza Łukasiewicz—Instytut Lotnictwa, Warsaw (PL)

(72) Inventors: Piotr Wolański, Warsaw (PL); Michał Kawalec, Warsaw (PL)

(73) Assignee: SIEC BADAWCZA LUKASIEWICZ-INSTYTUT LOTNICTWA, Warsaw (PL)

(*) Notice: Subject to any disclaimer, the term of this patent is extended or adjusted under 35 U.S.C. 154(b) by 0 days.

(21) Appl. No.: 18/061,611

(22) Filed: Dec. 5, 2022

(65) Prior Publication Data

US 2023/0175461 A1 Jun. 8, 2023

(51) Int. Cl.
*F02K 9/97* (2006.01)
*F02K 7/02* (2006.01)
*F02K 9/64* (2006.01)
*F02K 9/42* (2006.01)

(52) U.S. Cl.
CPC ............... *F02K 9/972* (2013.01); *F02K 9/42* (2013.01); *F02K 9/64* (2013.01); *F02K 7/02* (2013.01)

(58) Field of Classification Search
CPC ..... F02K 9/42; F02K 9/64; F02K 9/97; F02K 9/972; F02K 7/02; F02K 1/52; F02C 5/00; F23R 7/00
See application file for complete search history.

(56) References Cited

U.S. PATENT DOCUMENTS

| | | | |
|---|---|---|---|
| 5,201,832 A * | 4/1993 | Porter | B64G 1/401 244/171.1 |
| 6,213,431 B1 * | 4/2001 | Janeke | F02K 9/97 244/171.1 |
| 6,516,605 B1 * | 2/2003 | Meholic | F02K 9/97 60/247 |

(Continued)

FOREIGN PATENT DOCUMENTS

| CN | 111140399 A | 4/2017 |
|---|---|---|
| CN | 114001374 A | 2/2022 |

OTHER PUBLICATIONS

Rankin Brent, Overview of Performance, Application, and Analysis of Rotating Detonation Engine Technologies, Jan.-Feb. 2017, Journal of Propulsion and Power, vol. 33, No. 1, pp. 131-143.*

(Continued)

*Primary Examiner* — William H Rodriguez
(74) *Attorney, Agent, or Firm* — Gary J. Gershik

(57) ABSTRACT

The subject of the invention is a detonation rocket engine comprising an annular detonation chamber (5) connected to the Aerospike nozzle (4) and lines (2, 3) for supplying propellant components connected to the detonation chamber (5). The detonation chamber (5) has a bottom (9) connecting the inner wall (10) and the outer wall (11) between which the outlet (6) is formed. At the outlet (6) of the detonation chamber (5) there are at least three evenly distributed centring elements (1) connecting the inner wall (10) and the outer wall (11) of the detonation chamber (5), with cooling channels (7) connected to one of the lines (2, 3) supplying the propellant components to the detonation chamber (5).

8 Claims, 5 Drawing Sheets

(56) References Cited

U.S. PATENT DOCUMENTS

| | | | | |
|---|---|---|---|---|
| 6,629,416 B1* | 10/2003 | Johnson | .................... | F02K 9/97 |
| | | | | 239/265.17 |
| 6,964,154 B1* | 11/2005 | Sackheim | ................. | F02K 9/97 |
| | | | | 60/770 |
| 2002/0040951 A1* | 4/2002 | Janeke | ................... | B64G 1/401 |
| | | | | 244/171.1 |
| 2017/0138310 A1* | 5/2017 | Villarreal | ................ | F02K 9/978 |
| 2019/0003423 A1* | 1/2019 | Pelfrey | .................... | F02K 9/62 |
| 2020/0049103 A1* | 2/2020 | Craddock | ................. | F02K 9/68 |
| 2021/0164660 A1 | 6/2021 | Dyson et al. | | |
| 2022/0252004 A1 | 8/2022 | Yelken et al. | | |

OTHER PUBLICATIONS

Polish Search Report dated Sep. 7, 2022 in connection with Polish Application No. P.439776.

\* cited by examiner

# DETONATION ROCKET ENGINE COMPRISING AN AEROSPIKE NOZZLE AND CENTRING ELEMENTS WITH COOLING CHANNELS

CROSS-REFERENCE TO RELATED APPLICATIONS

This application claims the priority of Polish Patent Application No. P.439776, filed Dec. 7, 2021 the content of which is hereby incorporated herein by reference into the subject application.

FIELD OF THE INVENTION

The present invention relates to a detonation rocket engine of the type comprising an annular combustion chamber and an Aerospike nozzle.

BACKGROUND OF THE INVENTION

Currently used rocket engines utilizing liquid propellant use classic cylindrical combustion chambers with classic bell nozzles. These nozzles usually have very large dimensions, and additionally, during the flight of the rocket in the atmosphere, they do not guarantee optimal performance, because with the change of flight altitude, the rockets usually work in non-computational conditions, i.e. at the outlet of the nozzle there is a different pressure than the ambient pressure. Additionally, their disadvantage is their considerable length.

In contrast to classic nozzles, "Aerospike" type nozzles (hereinafter referred to as Aerospike nozzles) have the ability to adapt to external operational conditions (variable external pressure), and additionally they have a short length. The use of Aerospike nozzles with classic combustion chambers has not found practical application so far, apart from experimental engines, due to the significantly greater weight of such engine.

Only research on the development of rocket engines using continuously rotating detonation (CRD), also called Rotating Detonation Engines (RDE), or simply detonation engines, opened the possibility of effective connection of the detonation combustion chamber of a rocket engine with an "Aerospike" type nozzle.

From the patent description PL228311B1, a detonation engine nozzle is known, which includes a housing, closed with a bottom on one end and with a conical outlet on the other end. The housing, bottom, and outlet include cooling channels.

Publication US2005284127A1 relates to an example of a detonation engine with an annular combustion chamber and an Aerospike type nozzle.

SUMMARY OF THE INVENTION

However, laboratory tests of the performance of rocket detonation engines with an annular combustion chamber showed that thrust asymmetry is obtained during engine operation due to the inability to obtain an ideal axisymmetric nozzle cross-section.

The aim of the invention is to eliminate the asymmetry of thrust in detonation rocket engines with an annular combustion chamber.

A detonation rocket engine according to the invention comprises an annular detonation chamber connected to an Aerospike nozzle and lines for supplying components of the propellant connected to the annular detonation chamber. The detonation chamber comprises a bottom connecting an inner wall and an outer wall between which an outlet is formed. At the outlet of the detonation chamber there are at least three evenly distributed centring elements connecting the inner wall and the outer wall of the detonation chamber, wherein the centring elements having cooling channels connected to one of the lines for supplying components of the propellant to the detonation chamber.

Advantageously, additional cooling channels are formed in the Aerospike nozzle connected to one of the lines for supplying the components of the propellant.

Preferably, the centring elements are streamlined.

Preferably, the Aerospike nozzle is truncated cone in shape.

Thanks to the centring elements, the distance between the inner wall and the outer wall of the detonation chamber is kept constant along the entire circumference, and thus a uniform critical cross-sectional area of the nozzle around the entire circumference of the outlet, which eliminates the possibility of thrust asymmetry.

The use of cooling channels extending in the centring elements protects said elements against damage due to the high temperature of the exhaust gases leaving the detonation chamber.

BRIEF DESCRIPTION OF THE DRAWINGS

The invention is schematically illustrated in the embodiments in the drawing, in which.

DETAILED DESCRIPTION

Figure 1:
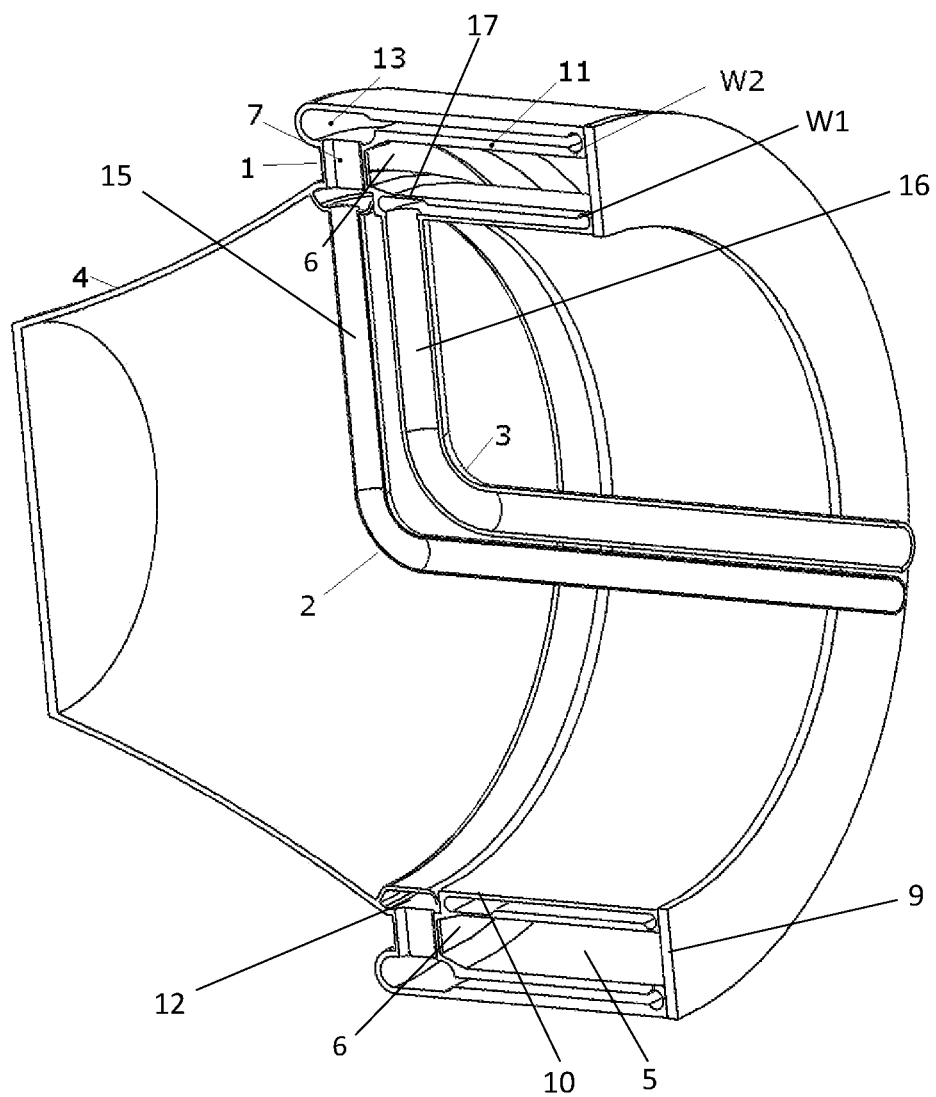
FIG. 1 shows a perspective view from the detonation chamber side of the detonation rocket engine according to the first embodiment, in cross-section.
Figure 2:
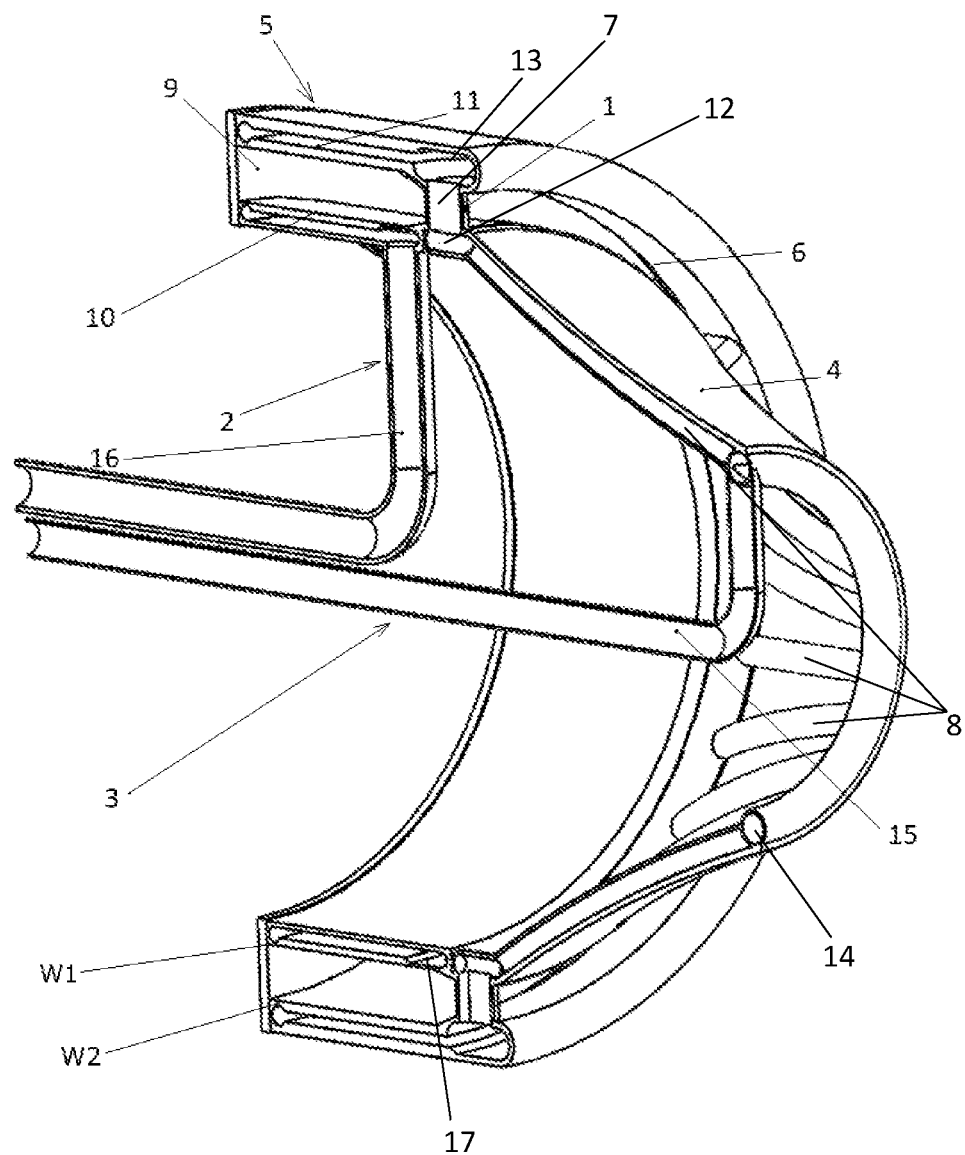
FIG. 2 shows a perspective view from the Aerospike nozzle side of the detonation rocket engine according to the second embodiment, in cross-section.
Figure 3:
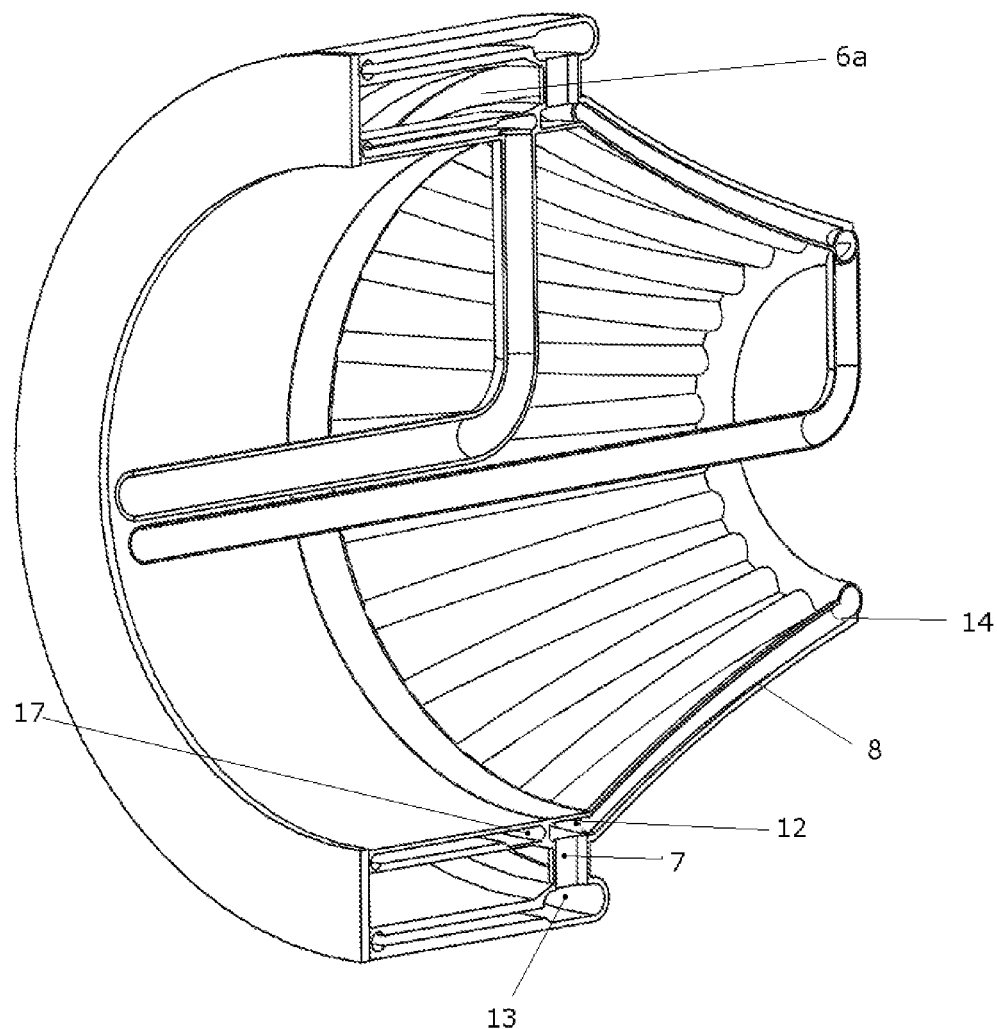
FIG. 3 shows a perspective view from the detonation chamber side of the detonation rocket engine according to the second embodiment, in cross-section.

A detonation rocket engine according to the first embodiment of the invention shown in FIG. 1 comprises an annular detonation chamber 5 constrained by a bottom 9, an inner wall 10 and an outer wall 11. The detonation chamber 5 also contains an outlet 6 located opposite the bottom 9. On the outlet 6 side there is an Aerospike nozzle 4 having a truncated cone shape and connected to the inner wall 10 of the detonation chamber 5. In other embodiments not shown, the Aerospike nozzle may also have a parabolic shape. Connected to the detonation chamber 5 are lines 2, 3, which lead the propellant components, in the form of fuel and oxidant, to the detonation chamber 5, in particular to the area at the bottom 9 where the fuel injectors W1 and the oxidant injectors W2 are located.

Figure 4:
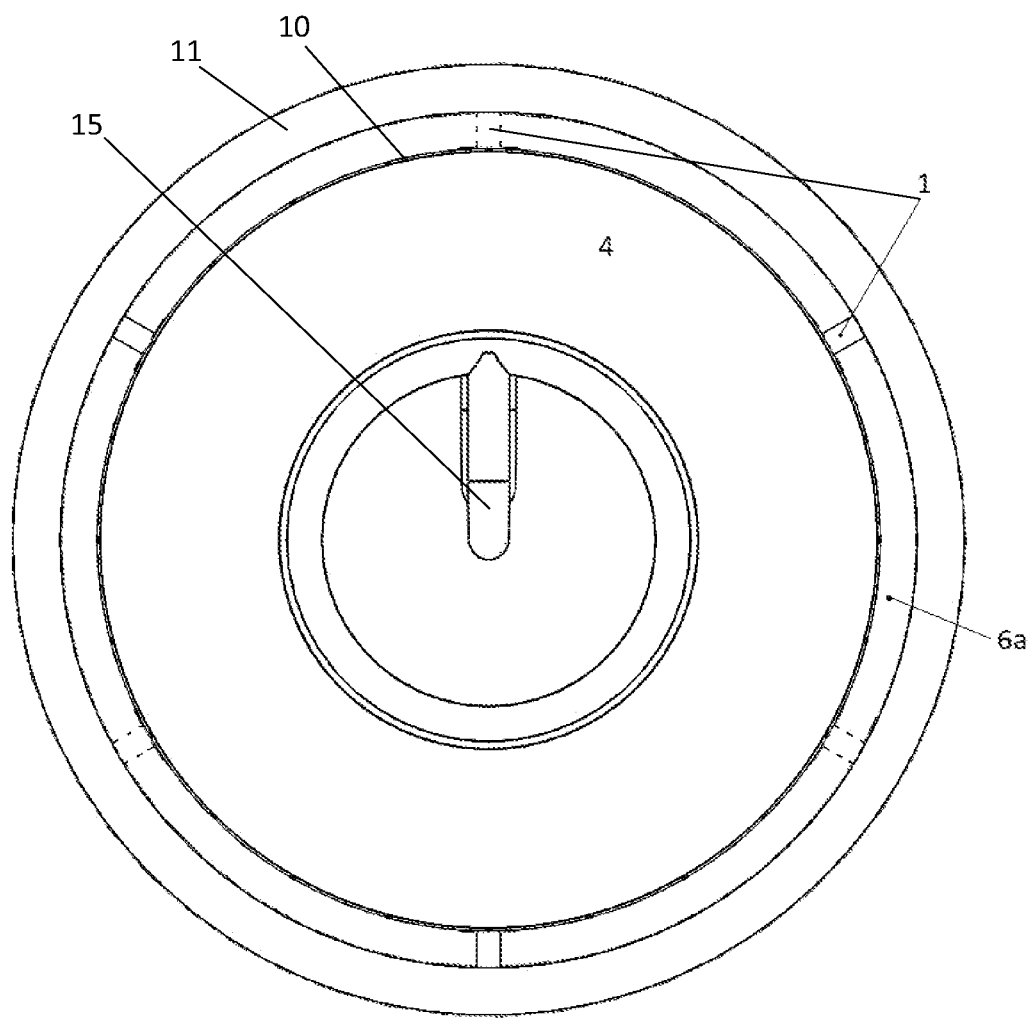
FIG. 4 shows a planar view of the Aerospike nozzle of the detonation rocket engine according to the second embodiment.
Figure 5:
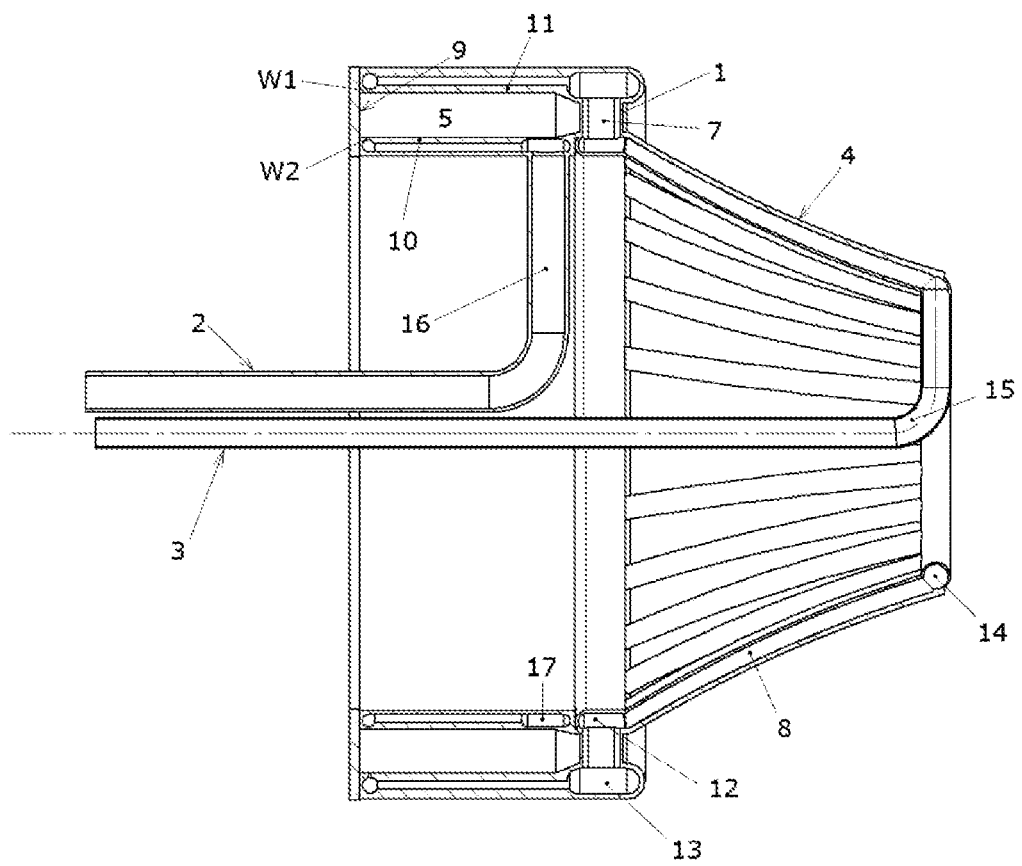
FIG. 5 shows a planar view of a cross-section of the detonation rocket engine according to the second embodiment.

In the outlet 6 of the detonation chamber 5 there are three centring elements 1 that connect the inner wall 10 and the outer wall 11, the centring elements 1 having a streamlined shape providing low resistance flow throttling to the exhaust gases, and are evenly distributed around the perimeter of the detonation chamber 5 dividing the outlet 6 on the outlet openings 6a (shown in more detail in FIG. 4). The number of centring elements 1 may be greater, depending, for example, on the dimensions of the engine and detonation chamber 5, or the operating conditions. Dashed lines in FIG. 4 indicate an exemplary arrangement of additional centring elements 1 for the case in which there are six centring elements 1.

In each of the centring elements 1 there is a cooling channel 7 to which the necessary volume of a cooling medium is supplied which is also one of the components of the propellant supplied from the stub pipe 15 of the line 2. The cooling channels 7 connect the first inner circumferential channel 12, formed in the inner wall 10 of the detonation chamber 5 and connected to the pipe stub 15, to the outer circumferential channel 13 formed in the outer wall 11 of the detonation chamber 5 which, towards the bottom 9, has a tapered portion terminating in injectors W2 supplying said propellant component to the detonation chamber 5.

The line 3 comprises a stub pipe 16 connected to a second internal circumferential channel 17 formed in the inner wall 10 which, towards the bottom 9, has a tapered portion terminating with injectors W1 supplying the second component of propellant to the detonation chamber 5.

In the detonation chamber 5 there are also ignition system elements (not shown) which initiate ignition of the supplied propellants. The presence of said ignition system is not necessary in the case of using hypergolic propellants, since then ignition takes place automatically after mixing the fuel and the oxidant in the detonation chamber 5.

In the second embodiment, shown in FIGS. 2-5, for additional cooling of the Aerospike nozzle 4, it comprises a circumferential channel 14 connected on one side to a pipe stub 15 and on other side, via additional cooling channels 8, to the first internal circumferential channel 12 of the detonation chamber 5.

During the operation of the engine according to the invention, ignition of the propellant components supplied to the detonation chamber takes place, resulting in their detonation burning. The exhaust gases are directed through the outlet 6 to the Aerospike nozzle 6. Due to the centring elements 1, the distance between the inner wall 10 and the outer wall 11 of the detonation chamber 5 is kept constant around the entire circumference, and thus the shape of the outlet 6 is kept constant around the entire circumference.

The fuel is supplied via the line 2, i.e. via the pipe stub 16 and the second internal circumferential channel 17 to the fuel injectors W1.

The oxidizer, which is also the coolant, is supplied through the line 3.

In the first embodiment, the oxidizer is supplied from the stub pipe 15 directly to the inner circumferential channel 12 and then to the cooling channels 7, the outer circumferential channel 13 and to the injectors W2. In this case, the Aerospike nozzle has a separate cooling, for example in the form of ablative cooling.

In the second embodiment, in order to cool the Aerospike nozzle 4 with the oxidant as well, it is additionally supplied from the nozzle 15 through the circumferential channel 14 provided in the Aerospike nozzle 4 and additional cooling channels 8 to the first internal circumferential channel 12.

The components of the propellant (fuel and oxidant) are delivered to the detonation chamber 5 under pressure that allows to overcome the flow resistance throttling through the individual channels and injectors.

The invention finds application in missile or rocket propulsion.

What is claimed:

1. A detonation rocket engine comprising an annular detonation chamber (5) connected to an Aerospike nozzle (4) and lines (2, 3) for supplying components of the propellant connected to the detonation chamber (5), wherein the detonation chamber (5) having a bottom (9) connecting an inner wall (10) and an outer wall (11) between which the outlet (6) is formed, characterised in that at the outlet (6) of the detonation chamber (5) there are at least three evenly distributed centring elements (1) connecting the inner wall (10) and the outer wall (11) of the detonation chamber (5), wherein the centring elements having cooling channels (7) connected to one of the lines (2, 3) supplying components of the propellant to the detonation chamber (5).

2. The detonation rocket engine according to claim 1, characterized in that in the Aerospike nozzle (4) additional cooling channels (8) are formed connected to one of the lines (2, 3) supplying components of the propellant.

3. The detonation rocket engine according to claim 1, characterized in that the centring elements (1) have a streamlined shape.

4. The detonation rocket engine according to claim 1, characterized in that the Aerospike nozzle (4) has truncated conical shape.

5. A detonation rocket engine comprising an annular detonation chamber (5) connected to a nozzle that adapts to external operational conditions (4) and lines (2, 3) for supplying components of the propellant connected to the detonation chamber (5), wherein the detonation chamber (5) having a bottom (9) connecting an inner wall (10) and an outer wall (11) between which the outlet (6) is formed, characterised in that at the outlet (6) of the detonation chamber (5) there are at least three evenly distributed centring elements (1) connecting the inner wall (10) and the outer wall (11) of the detonation chamber (5), wherein the centring elements having cooling channels (7) connected to one of the lines (2, 3) supplying components of the propellant to the detonation chamber (5).

6. The detonation rocket engine according to claim 5, characterized in that in the nozzle (4) additional cooling channels (8) are formed connected to one of the lines (2, 3) supplying components of the propellant.

7. The detonation rocket engine according to claim 5, characterized in that the centring elements (1) have a streamlined shape.

8. The detonation rocket engine according to claim 5, characterized in that the nozzle (4) has truncated conical shape.

* * * * *

UNITED STATES PATENT AND TRADEMARK OFFICE
CERTIFICATE OF CORRECTION

| | |
|---|---|
| PATENT NO. | : 11,795,891 B2 |
| APPLICATION NO. | : 18/061611 |
| DATED | : October 24, 2023 |
| INVENTOR(S) | : Piotr Wolanski and Michal Kawalec |

It is certified that error appears in the above-identified patent and that said Letters Patent is hereby corrected as shown below:

On the Title Page

Please add Item (30) entitled "Foreign Application Priority Data":
(30) Dec. 07, 2021 (PL)..........P.439776

Signed and Sealed this
Third Day of September, 2024

Katherine Kelly Vidal
*Director of the United States Patent and Trademark Office*